Aug. 10, 1948.       G. H. FRITZINGER       2,446,579
POLARIZED ARMATURE CURRENT RATIO METER
Filed Dec. 20, 1944                         3 Sheets-Sheet 2

Inventor
George H. Fritzinger
By Henry Lanahan
Attorney

Aug. 10, 1948.   G. H. FRITZINGER   2,446,579
POLARIZED ARMATURE CURRENT RATIO METER
Filed Dec. 20, 1944   3 Sheets-Sheet 3

INVENTOR.
George H. Fritzinger
BY Henry Lanahan
ATTORNEY

Patented Aug. 10, 1948

2,446,579

UNITED STATES PATENT OFFICE 2,446,579

POLARIZED ARMATURE CURRENT RATIOMETER

George H. Fritzinger, West Orange, N. J., assignor to Thomas A. Edison, Incorporated, West Orange, N. J., a corporation of New Jersey Application December 20, 1944, Serial No. 569,083

18 Claims. (Cl. 171—95)

This invention relates to electrical instruments which utilize permanent magnets, and more particularly to electrical measuring instruments of the moving-magnet type.

This application is a continuation in part of my application Serial No. 492,195, filed June 23, 1943, now abandoned.

The distinguishing mechanical features of the invention reside principally in the shape and construction of the magnet, the arrangement of the field coil or coils relative to the magnet, and the layout and design of the instrument construction.

As a preferred illustration thereof, I herein show and describe my invention in terms of a ratiometer, but it will be understood that my invention is not limited in its broader aspects to this kind of meter and that I accordingly intend no unnecessary limitation of my invention thereto.

Ratiometers are used commonly in bridge circuits for measuring resistance or variations in conditions representable in terms of resistance such, for example, as temperature, pressure, etc. In these ratiometer measuring systems, the ratiometer instrument is deflected according to changes in the ratio of two currents, which ratio is itself varied by variation of an element of the bridge circuit according to changes in the condition to be measured. The advantage of these ratiometer systems is that when both currents are supplied by the same voltage source the ratio of the currents, and therefore the measuring indications, are independent of variations in the voltage of that source. These ratiometer measuring systems may accordingly be energized by ordinarily available voltage sources. One specific instance, for example, wherein such ratiometer systems are now widely used is on aircraft for measuring temperature, in which case the systems are energized by ordinary batteries.

Heretofore, ratiometers of the moving-magnet type have used permanent magnets that are symmetrically shaped relative to the pivot axes of the magnets—i. e., the portions of the magnets diametrically opposite the pivot axes correspond in size, shape and relative disposition—and have had the field coils mounted so that their medial planes coincide substantially with the pivot axes of the magnets, the common practice being to divide each field coil into two sections and place the respective sections immediately adjacent the pivot axis at the opposite sides thereof. While these prior arrangements of the moving-magnet type of ratiometer have been quite satisfactory, they have been deficient in that they have a non-uniform scale, and have a complicated construction wherein the rotor magnet is so "penned in" by the field coils that it cannot be removed to repair and replace the pivots without disassembling the coils and disturbing the meter calibration.

My invention distinguishes in its mechanical aspects from these prior arrangements of the moving-magnet type of ratiometer principally in that I use a rotor magnet construction which is non-symmetrical with respect to its pivot axis, and in that I locate the field coils so that their physical centers are displaced substantially from the pivot axis of the rotor. In so doing I am enabled to control the scale distribution so as to obtain either a uniform scale or non-uniform scales of predetermined character. Additionally, I am enabled to remove the rotor without disturbing the mounting of the field coils and to simplify vastly the meter construction. Moreover, these important advantages are realized while maintaining an efficient coupling of the rotor with the field coils and a relatively high driving torque.

My invention has thus for an object to provide a novel and improved form of electrical measuring instrument of the class described which is characterized by a uniform scale.

It is another object of my invention to provide such instrument having a high efficiency and driving torque.

It is another object to provide a moving-magnet electrical instrument which is highly simple and economical in construction.

It is another object to provide an improved electrical instrument of the moving-magnet type wherein independent removal of the rotor is permitted without disturbing the field coils or the calibration of the instrument.

It is another object of my invention to provide an improved moving-magnet electrical instrument having relatively few parts of simple and economical construction which are easy to assemble and disassemble.

It is another object to provide an improved ratiometer having a minimum number of field coils.

It is another object to provide such ratiometer in a form wherein the field coils have a shape that is economical to produce.

A further object of my invention is to provide an electrical instrument construction having a frame made of Bakelite or other material that may be fabricated by molding or casting.

These and other objects and features of my invention will more fully appear from the following description and the appended claims.

In the description of my invention reference is had to the accompanying drawings, of which.

Ratiometers of the moving-magnet type comprise a pivoted magnet and at least two separate field coils which are spaced angularly about the pivot axis of the magnet. When only one or the other of the field coils is energized, the magnet is attracted to a zero position relative to that coil wherein its own magnetic field is most nearly aligned and directed with that of the coil, but when both coils are energized the magnet seeks an intermediate position depending upon the ratio of the currents in the two coils, the particular position being one wherein the torques of the respective coils on the magnet are in balance. The reason the positioning of the magnet becomes so stabilized in such intermediate positions is because the torque reaction between the magnet and the respective field coils has a space differential—that is, for a given fixed energization of either coil, the torque exerted by the field of the coil on the magnet varies with the deflection of the magnet from zero position. A plot of the torque reaction between the rotor magnet and each field coil, for constant current energization of that coil, may be referred to as the static torque-deflection characteristic of the ratiometer.

Figure 8:
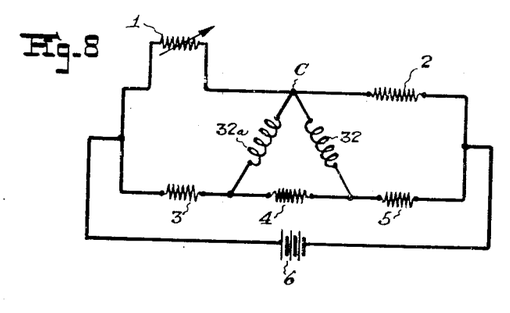
Figure 8 is a schematic view of a typical bridge circuit for the present ratiometer.

The present invention is particularly well suited, although not necessarily limitatively, for use in an electrical bridge circuit of the type described and claimed in the Kelly Patent No. 2,362,562, issued November 14, 1944 and having a common assignee with the present invention. For a better understanding of my invention this bridge circuit may be herein first described. This bridge circuit has an upper branch serially including a variable resistor 1 and fixed resistor 2, and has a lower branch serially including resistors 3, 4 and 5. The two field coils of the ratiometer, which are here designated as 32 and 32a, are connected in series across the middle resistor 4 of the lower branch and connected at their common junction point C to the upper branch between resistors 1 and 2, this connection of the coils and middle resistor being often appropriately referred to as an electrical delta. Current to the bridge circuit is supplied by a suitable voltage source such as a battery 6.

The variable resistor element 1 is varied in accordance with changes in the value of the condition to be measured. For example, for measuring temperature this element may comprise a temperature resistance bulb such as is described in the pending Kelly application, Serial No. 493,947, filed July 8, 1943, now abandoned, and having a common assignee with the present invention. In response to a given variation in resistance of this resistor element, the voltage at junction point C will shift relative to the voltage drop across resistor 4 and, as a result, the voltage drop across one field coil will be decreased and that across the other coil will be increased. If the bridge circuit is symmetrical with respect to a medial plane through the junction point C and a mid-point of the middle resistor 4, the decrease in voltage drop across one coil will equal substantially the increase in voltage drop across the other coil. If the resistors 2 and 5 are equal but materially larger than the resistor 3, the voltage drops across the two coils may not vary equally with change in resistor 1; however, this inequality can be compensated for by adjusting the resistances of the cross arms containing the coils 32 and 32a, this mode of compensation being disclosed and claimed in the abovementioned Kelly Patent No. 2,362,562.

It may be here noted that the voltage variation across the respective field coils does not vary truly linearly with change in the resistance 5, due to a non-linear characteristic of the bridge circuit itself, and that the resistance of the usual thermometer bulb does not vary truly linearly with temperature. However, in actual practice the non-linearity of the bulb is such as to substantially compensate for the non-linearity of the bridge circuit. Therefore, the temperature-responsive electrical bridge circuit of Figure 8 may be considered as producing substantially equal arithmetical changes in the currents in the two field coils in response to equal changes in the condition to be measured.

In the common arrangement of ratiometer hereinabove referred to, which is the arrangement employing a bar magnet that is symmetrically shaped relative to its pivot axis and field coils which have their medial planes coinciding substantially with that axis, the torque exerted on the magnet by each coil, for a given fixed current in the coil, varies substantially sinusoidally. Due to the sinusoidal non-linear character of these curves, fixed incremental increases in the current of one coil accompanied by like incremental decreases in the current of the other coil, such as are produced in the coils by the bridge circuit above described in response to fixed incremental changes in the temperature of the resistor element 1, do not produce equal scale deflections throughout the scale range. Instead, the scale divisions are expanded throughout the central portion of the scale and compressed at the ends, and the scale length is quite definitely limited to the angular span between the coils.

A ratiometer for the bridge circuit above described will indicate linearly on a uniform scale provided the torque deflection characteristics of the ratiometer have a linear shape over the operating deflection range or else a prescribed non-linearity as is hereinafter described. By offsetting the field coils from the pivot axis of the rotor magnet and asymmetrically shaping the rotor magnet I am enabled to control the shape of the torque deflection characteristics and to obtain those desired shapes over a wide deflection range—i. e., 120° and more—which will give a linear, or uniformly distributed, scale.

It may be noted that an effect of asymmetrically shaping the rotor magnet is to offset the effective center of the flux field of the rotor magnet from its pivot axis and to cause the flux from one pole end to be more widely distributed than that from the other pole end, it being understood that the term "effective center" is herein used to mean that localized region on the magnetic axis of the rotor magnet from which the flux appears to radiate, or from and toward which the flux field diverges and converges. With such asymmetrical rotor magnet, the pole ends of the rotor magnet have different torque reactions with each field coil, and these torque reactions vary relatively to each other with the angular deflection of the rotor magnet. It is largely through control of the individual torque reaction characteristics of the respective pole ends of the rotor magnet that I am enabled to obtain an overall or composite torque deflection characteristic of the desired shape.

It will be observed that the desired torque deflection characteristics between the rotor and field coils cannot be obtained practically in ratiometers by asymmetrically disposing the shield, or magnetic flux return circuit means, relative to the rotor. This is because such asymmetrical disposition of the shield would place the rotor under the influence of a fixed magnetic bias, with the result that the meter would no longer function as a ratiometer under varying voltage supply. Asymmetrical shaping of the rotor magnet relative to its pivot axis does not however impose any fixed magnetic bias on the rotor so long as the shield, or magnetic flux return circuit means, is symmetrically disposed relative to the pivot axis. An asymmetrical rotor magnet working with a symmetrical shield does however fulfill the aforestated desired condition that the effective center of the flux field of the rotor shall be displaced from the pivot axis.

The offsetting of the effective center of the flux field of the magnet from its pivot axis can be accomplished in several different ways, each, however, with the use of a magnet construction of generally bar form. At this point it may be noted that I hereafter use the term "magnet construction" to mean one or more permanent magnetic materials, or permanent and non-permanent magnetic materials, which are made to constitute a unitary structure, and that I apply the term "bar" thereto as including constructions wherein the several dimensions thereof are not uniform but wherein the length dimension is substantially greater than the mean breadth and mean thickness dimensions.

A preferred embodiment of a ratiometer according to my invention utilizes a one-piece magnet construction, and is herein shown in Figures 1 to 7 inclusive. This ratiometer has a frame 10 made preferably of a plastic such as Bakelite. This frame has an axial bore 13 extending down from the top thereof and is generally cylindrical, but has two peripheral flats 11 and 11a midway between its ends which form respective segmentally-shaped recesses 12 and 12a that intersect the bore 13, the flats being so inclined about the axis of the frame that the top and bottom circular portions of the frame are joined by a column 10a in the form of the segment of an annulus and a column 10b which is V-shaped in cross section. At the inner end of the bore there is a damping cup 14, which is made for example of copper. This cup projects into the respective recesses 12 and 12a, the depth of the bore being such that the cup is located at the centers of these recesses. At the bottom end of the frame there is a central well 15 and a small axial hole 16 leading up from the well into the bore 13. Within the hole 16 there is mounted an internally-threaded sleeve 17 which serves as a support for the bottom jewel 18. Mounted onto the upper end of the frame there are two studs 19 located in diametrically opposite relation to the bore 13. These studs have shoulder ends to receive a cross bar or bridge 20 and are internally threaded to receive screws 21 for holding the bridge thereto. This bridge serves as a support for a top jewel 22. This jewel is positioned axially in line with the bottom jewel 18 and is held locked in place by a lock nut 23.

Figures 2, 3, 4, 5, 6, 7:
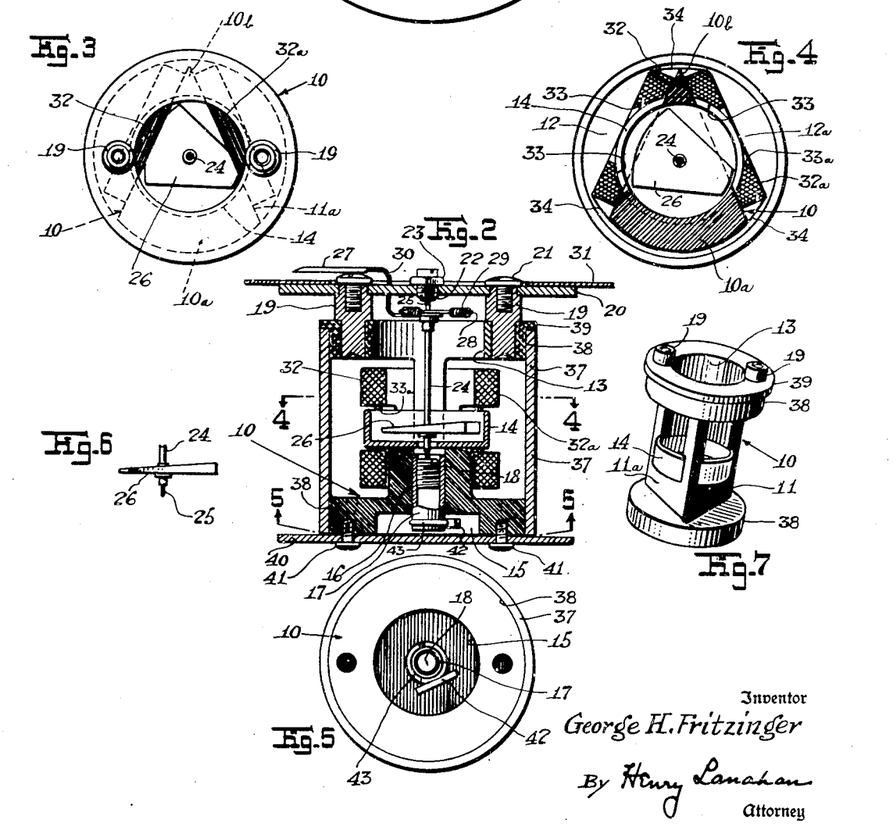
Figure 2 is a principally axial sectional view taken on the line 2—2 of Figure 1.
Figure 3 is an axial end view, similar to Figure 1, but showing the meter with the dial and pointer removed.
Figure 4 is a sectional view taken substantially on the line 4—4 of Figure 2.
Figure 5 is a bottom fractional view taken substantially on the line 5—5 of Figure 2.
Figure 6 is a side elevational view of a form of rotor magnet according to my invention, taken at right angles to the magnetic axis of the magnet.
Figure 7 is a perspective view of the frame for the ratiometer shown by the foregoing figures.

The frame 10 above described is preferably formed by molding or casting; if the molding process is employed the damping cup 14, sleeve 17 and studs 19 are integrally and permanently secured thereto in their respective proper places. To this end the sleeve and studs may have their embedded portions suitably knurled so as to become firmly anchored to the frame.

Figure 1:
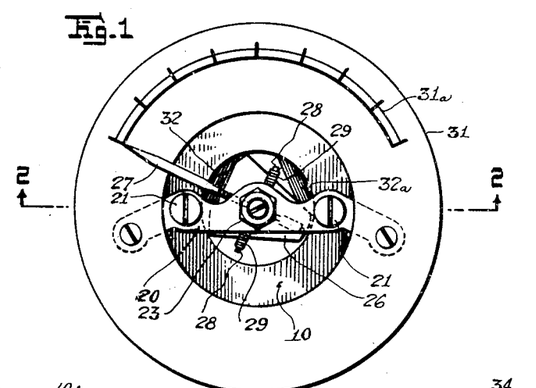
Figure 1 is a top axial end view of a ratiometer embodying my invention.

The rotor for the meter, which is pivotally supported by the jewels 18 and 22, comprises a spindle 24 having pivots 25 in the ends thereof which engage the jewels. On the lower portion of this spindle within the damping cup 14 there is a permanent magnet 26, and on the upper portion of this spindle there is a pointer 27 having the usual cross arms 28 and balancing weights 29. This pointer is offset upwardly as at 30 so as to overlie a dial 31 that is mounted at the top of the instrument on the bridge 20, the dial having a scale 31a with which the pointer registers as is shown in Figure 1.

In the respective recesses 12 and 12a there are mounted the aforementioned field coils 32 and 32a. These coils are identical and have their core spaces engaged by the projecting peripheral portions of the damping cup 14. These are flat coils which, in their preferred construction, have core spaces 33 of a cylindrical segmental shape to which the projecting peripheral portions of the damping cup will snugly fit. The innermost portions of the coils may however be wound on a rectangular core space 33a (see Fig. 4) so that the innermost turns of the coils will have a definite diameter and width. In so providing the coils with such core spaces 33, they are located accurately in directions axial of the meter by the damping cup. Moreover, when in mounted positions, they lie against the flats 11 and 11a and be angularly located thereby about the pivot axis without the need for any locating shoulders or other special shaping of the cup as is so commonly done.

To hold the coils firmly in their mounted positions, a band 34, such as of Scotch tape, may be wrapped around the coils and frame 10 as is shown in Figure 4, the solid peripheral portion 10a of the frame between the recesses 12 and 12a being suitably reduced in radius so that the band will not project beyond the confines of the frame.

Surrounding the frame 10 is an external cylindrical shield member 37 which is made of a highly-permeable non-permanent magnetic material such as that known commercially as Permalloy or Mumetal. This shield member is located, with its axis coinciding with the pivot axis of the magnet 26, by the top and bottom annular shoulders 38 on the frame 10 and is held axially in place between a peripheral flange 39 at the top of the frame and a bottom plate 40 that is held by screws 41 to the bottom end of the frame.

With the meter construction so far described, the magnet 26 and pointer 27 float pivotally in the jewels 10 and 22; as a result, the pointer may drift across the scale when the meter is not in use. Ordinarily, however, it is desirable to have the pointer located definitely at some predetermined position on the scale during non-use of the meter, and for this reason there is provided a small so-called "drift" magnet 42. This magnet is conveniently located within the bottom well 15 of the frame 10, as is shown in Figures 2 and 5, and is there mounted rotatably by being secured to a split ring 43 that engages an annular peripheral groove provided in a depending portion of the sleeve 17. The magnet may accordingly be adjusted angularly about the pivot axis, with the ring sliding on the sleeve 17, but the ring so grips the sleeve as to frictionally hold the magnet in any of its adjusted positions. Into whatever position the drift magnet is adjusted, the main magnet 26 will be attracted to a position wherein its magnetic axis will be aligned and directed with that of the drift magnet, and the pointer will become biased to a definite position determined by the adjustment of the drift magnet. While the magnetic bias so created is made sufficiently strong to restore the pointer normally to a definite position when the meter is not in use, it is not made strong enough to disturb the normal operation of the meter.

The one-piece magnet 26 which I preferably employ comprises a solid piece of a highly efficient and permanent magnetic material such as that known commercially as "Alnico." This magnet has its volume so asymmetrically distributed as to be narrow and thick at one pole end and relatively broad and thin at the other pole end, the areas of its opposite pole end faces being however substantially equal so that the total useful flux from each end of the magnet will be of the same order of magnitude. One magnet of this character which has been satisfactorily employed has the end face of the narrow end portion of the magnet and the corners of the broad end portion thereof located on a common radius about the pivot axis as a center, but the broad end is terminated on a radius larger than the common radius, about the narrow end portion as a center, so that the central portion of the broad end face will be receded from this common radius. The thickness of the magnet is varied substantially evenly between the two ends as is shown in Figure 6.

The magnet is charged, or magnetized, along its longitudinal axis through its pivot center, which axis then becomes its so-called magnetic axis. The magnetizing is done with the use of non-permanent magnetic shoes which are shaped to fit the respective end faces of the magnet. After the magnet has been charged the shoes are removed, care being taken in the removal of each shoe to break all points of contact at the same time.

The normal deflection range of the meter is between the zero positions of the magnet wherein the broad end thereof is directed axially toward the respective field coils, it being understood that in this range the magnet and field coils are so relatively polarized that the coils have an attractive influence on the broad end of the magnet; the meter is however not restricted to this normal deflection range as is hereinafter pointed out. As an aid to understanding the invention, the pointer is aligned with the magnetic axis of the magnet and pointed in the direction of the broad end thereof, and the scale is shown as being limited to the angular span between the field coils. Accordingly, when the broad end of the magnet is directed axially toward the leftward coil 32 the pointer reads zero on the scale and when the broad end of the magnet is directed toward the rightward coil 32a the pointer reads maximum on the scale, all as is apparent by reference to Figure 1.

Before considering the torque characteristics of the present magnet, there may well be considered the torque characteristics which would be obtained were a bar magnet used which is symmetrically shaped relative to its pivot axis. A symmetrically-shaped bar magnet working with coils offset from the pivot axis, such as the field coils 32 and 32a, will have approximate respective torque characteristics 44 and 44a shown in Figure 9, the characteristics being shown for a 180° deflection range of the magnet, it being understood that the dotted characteristics merge into the characteristics 45 and 45a hereinafter explained. These are doubly-humped characteristics which are symmetrical about vertical lines at points midway the respective 180° ranges shown. The angular distance on the deflection axis between the humps is generally about 90° but will increase somewhat with decrease in the width of the pole ends of the magnet and with decrease in the total angular span of each coil about the pivot axis as a center. The particular significance of these humps, however, is that when a coil is offset from the pivot axis of the magnet, the coil will exert its greatest torque on the magnet when the magnetic axis of the magnet is at a critical angle of approximately 45° from the pivot axis of the coil and the flux from that pole end of the magnet which is directed towards the coil is relatively concentrated.

Figure 9:
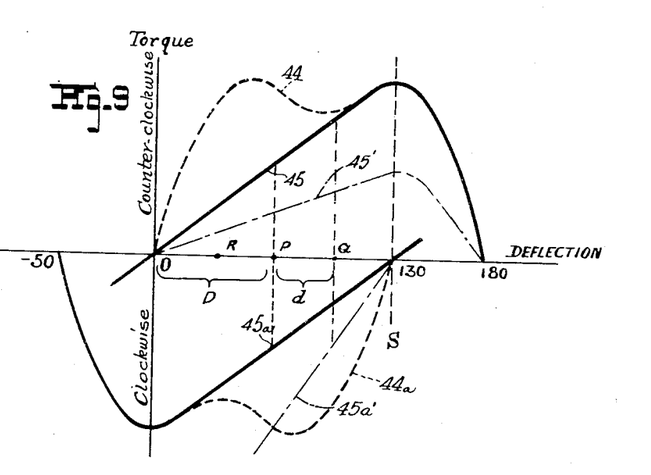
Figure 9 is a set of curves showing approximately the torque characteristics between the rotor magnet and the respective field coils for the present ratiometer, including a dotted showing of the analogous torque curves which would be obtained were the present magnet replaced by a symmetrical bar magnet.

The torque characteristics which are obtained between the magnet 26 above described and the respective field coils 32 and 32a are shown by the aforementioned solid line characteristics 45 and 45a of Figure 9. Taking for example characteristic 45, which is the torque characteristic for the leftward coil 32, it will be noted that the immediate effect of broadening the end of the magnet which is directed toward the coil is to reduce the rate of change of flux linkage of the magnet with the coil as the magnet is deflected from zero position. This has the effect of reducing the rate of torque increase exerted by the coil on the magnet as is particularly evident by comparison with the respective dotted torque characteristic 44 above explained. As the magnet is deflected through the intermediate deflection range where the symmetrical bar magnet attains its first maximum value, both the broadening and receding of the one end of the magnet 26 contribute to reducing the rate of change of flux linkage with the coil so as to keep the torque increase, with deflection, at an essentially even rate, it being understood that the receding is particularly effective because of the symmetrical disposition of the shield 37 about the pivot axis of the magnet, which shield forms a return circuit for a large proportion of the useful flux of the magnet. At still greater deflections of the magnet from zero position relative to the coil, the narrow thick end of the magnet comes more and more into play, and there is approximated the condition attained by the symmetrical bar magnet at the second hump of its torque characteristic 44, this condition being the presence of a concentrated flux field at a critical angle of approximately 45° relative to the axis of the coil. As a result, the general even rate of increase in torque is maintained through the deflection range to where the second hump (of characteristic 44) occurs, and an essentially linear torque characteristic is obtained throughout this range. This range over which the torque characteristic is so made essentially linear is, as a typical case, approximately 130°.

A set of approximate representative dimensions for the ratiometer just above described, which has been satisfactorily employed, may be now noted but without intending any unnecessary limitation thereto: The narrow end face and the corners of the broad end face of the magnet may lie on a common radius of $\frac{3}{32}''$ about the pivot axis as a center; the narrow end face may be approximately $\frac{1}{8}''$ wide and .065'' high; the broad end face may subtend an angle of 115° relative to the pivot axis, may lie on a radius of $\frac{7}{16}''$ about a point on the magnetic axis of the magnet at the narrow end portion thereof, and may be .02'' high; and the thickness of the magnet may vary evenly between its two pole ends. With this magnet, the damping cup 14 may have an external diameter of $\frac{5}{8}''$ and be $\frac{1}{16}''$ high, and the peripheral portions thereof which project beyond the flats 11 and 11a may subtend an angle of approximately 110° relative to the pivot axis. The internal diameter of the shield 37 may be $\frac{31}{32}''$. Each field coil may be $\frac{1}{8}''$ thick and may have a diametrical length (normal to the pivot axis when the coils are in mounted positions) equal approximately to $\frac{23}{32}''$. The core spaces of the coils will then be approximately $\frac{1}{16}''$ high and otherwise shaped as is hereinbefore described so as to fit snugly the projecting peripheral portions of the damping cup.

The torque characteristics 45 and 45a are the static characteristics which are obtained for equal fixed currents in the field coils, this being the condition obtained when the potential of the junction C is substantially midway the potential drop appearing across the middle resistor 4 of the lower branch of the bridge circuit. For this condition, the two torque characteristics are equal at the mid-point P of the scale range S (see Figure 9), and this point P is accordingly the present indicating point of the meter. As the coil currents vary in response to variation in the value of resistor 1, these torque characteristics pivot about their intersection points with the deflection axis and take positions of different slope. For instance, a given increase in temperature of resistor 1 will cause the torque characteristic 45 to swing downwardly about its origin O to the lower-valued characteristic 45' and will at the same time cause the other torque characteristic 45a to increase in like manner to the higher-valued characteristic 45a'. The two torque characteristics are now equal at a deflection point Q, which becomes accordingly the new indicating point of the rotor. In other words, when the temperature of the resistor element 1 rises by a given amount, the rotor is deflected by an angle d from the point P to the point Q.

It will be understood that since the torque characteristics 45 and 45a are substantially linear over the operating deflection range, and since these characteristics increase and decrease in slope in substantially linear relation with the temperature of the resistor element 1, the rotor will be deflected linearly with changes in the temperature of that element and the meter will indicate in relation to a uniformly distributed scale. Thus, when the temperature of the resistor element 1 falls by the same amount as just above considered, the rotor is deflected counterclockwise by the same angle d from the mid-scale position P to the point R of Figure 9.

I have found that in ratiometer systems of the character described there is no necessity to have linear torque characteristics in order to obtain a uniform scale distribution. The general basis for uniform scale distribution is that the static torque deflection characteristics obtained between the rotor and the two field coils, for equal fixed currents in the coils, shall have such shape that at deflections d of the rotor, clockwise or counterclockwise, from the mid-scale position P, the ratio of the torque of the coil of lesser influence to that of the coil of greater influence shall equal substantially $$\frac{D-d}{D+d}$$

where D is ½ of the fixed angular span between the axis of the coils or, as herein considered, ½ the scale range S. The limitation to equal fixed currents applies of course when the coils are identical—which will typically be the case. However, basically, the important point is that the coils have equivalent magnetic fields, that is, fields of equal strength and distribution. Equal distribution is obtained when the coils have identical sizes and shapes. Equal strength depends only on the coils having equal ampere turns, and may be realized from coils having different turns and resistance.

It will be observed that for any given shape of torque characteristic throughout ½ the operating deflection range—i. e., from the mid-scale position P to either scale extremity—the abovestated formula establishes the shape of the torque characteristic through the other ½ of the deflection range which is required for a uniformly distributed scale. Say, for example, the shape of the torque characteristic 45a of Figure 9 is known from the mid-scale point P to the maximum scale extremity S. By the above formula the shape of the other torque characteristic 45 through this same ½-scale range is determined. Since both torque characteristics 45 and 45a have substantially the same shape, the calculated shape of the ½ portion of characteristic 45 from the mid-scale point P to the maximum scale extremity S is the same as the shape of the torque characteristic 45a from the mid-scale point P to the lower scale extremity O. Thus there is established a shape of torque-deflection characteristic throughout the whole deflection range which is required for a uniformly calibrated scale.

The abovestated formula is a particularly useful tool in designing a ratiometer so that it will have a uniformly distributed scale. For instance, upon obtaining a given shape of torque characteristic between a rotor and field coil, the deviation in that characteristic which is required to obtain a uniformly distributed scale may be readily ascertained by this formula. This is done either by considering the lower or upper half of the torque characteristic as suitable and then ascertaining the deviations which may be required in the remaining half portion of the characteristic. Those deviations can then be made, in the main, by changing the shape of only the pole end portion of the rotor magnet construction which is chiefly instrumental in determining the shape of the half portion of the characteristic which is to be revised. Thus, by the above formula one is guided to the desired shape of rotor magnet construction and field coils which is required to give a uniformly distributed scale.

From an operational standpoint it is preferable to work with torque characteristics which are substantially linear over the operating deflection range because linear torque characteristics will ordinarily permit wider manufacturing tolerances for a given scale error than will non-linear torque characteristics. However, in cases where a magnet construction having a linear characteristic would require a relatively large counterbalancing weight to balance the rotor, it may be preferable to employ magnet constructions having non-linear torque characteristics as then the counterbalancing weights may be reduced and a greater efficiency, as of driving torque to rotor weight, may be realized.

Figure 14:
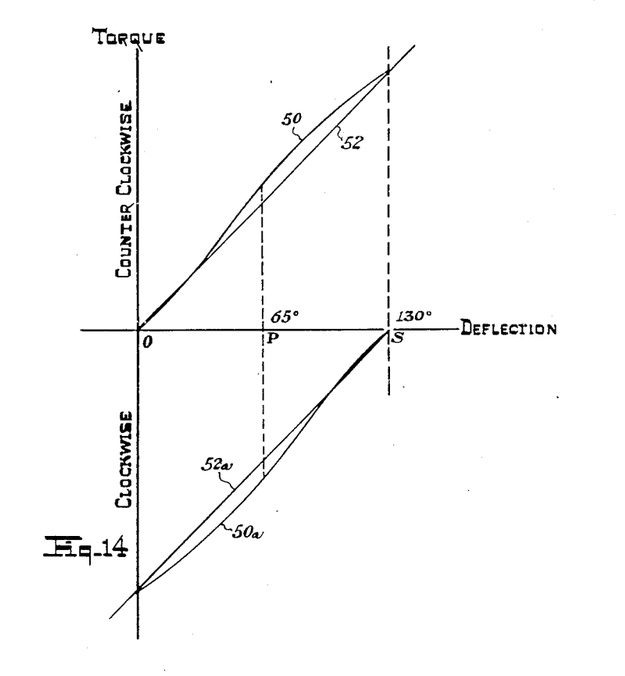
Figure 14 is a set of typical torque characteristics of non-linear form which give a uniform scale distribution in the present ratiometer.

It will be understood that the abovestated formula prescribes an unlimited number of different shapes of torque characteristics each of which will give a substantially uniform scale distribution in ratiometer systems of the character herein described. In Figure 14, I show a representative set of such non-linear torque characteristics, referred to as 50 and 50a respectively. These are the approximate torque characteristics which are obtained with a one-piece "Alnico" magnet 51, shown in Figures 15 and 16, and with the field coils 32 and 32a in the meter construction above described. By reference to the medial straight line 52 superimposed on the torque characteristic 50 in Figure 14, it will be seen that the characteristic 50 has less than average slope in its initial and final deflection ranges, and has greater than average slope in its middle range. With relation to the other characteristic 50a, it will be seen that portions of the respective characteristics having similar slopes overlie one another along the deflection axis. This is a requisite condition for a uniform scale distribution.

Figure 15:
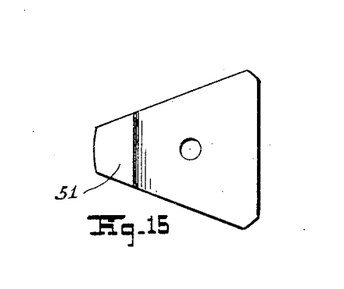
Figure 15 is an axial end view of a representative rotor magnet for obtaining the torque characteristics of Figure 14.
Figure 16:
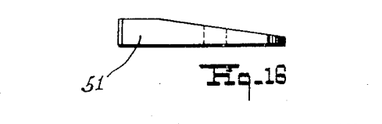
Figure 16 is a side elevational view of the rotor magnet of Figure 15.

Purely by way of illustrative example, the magnet 51 may be made of "Red Streak Alnico" and may have the following approximate dimensions: the narrow pole and the corners of the broad pole may terminate on a common radius of .242" about the pivot axis as a center; the overall length may be approximately .414"; the narrow pole end may be approximately .100" wide and .070" thick at the end face; the broad pole end may have a maximum width of .380" and be approximately .022" thick at the end face; and the angle of taper may be approximately 8° 30' with the bottom face of the magnet.

The average driving torque throughout the deflection range in ratiometers of the character described—i. e., the average torque exerted on the rotor to restore it to positions of balance once the rotor is deflected forcibly therefrom—is dependent on the average slopes of the static torque characteristics obtained between the rotor and the field coils per unit current in the coils, the torque being greater as the slope increases and vice versa. On increasing the value of the resistor 4 in the bridge circuit of Figure 8, the driving torque is made greater because as this resistor is increased the potential drop across the field coils is increased. A counteracting factor, however, in increasing the resistor 4 is that it decreases the length of scale per unit change in the condition being measured. This is because an increase in the resistor 4 requires a greater range of variation of resistor element 1, or of temperature in the present instance, to move the potential of the common junction C of the coils through the range of the potential drop across resistor 4; yet for that greater range of temperature variation the pointer is deflected through the same angular length of scale, this length being the angular span between the field coils.

On the other hand, changing the angular span of the field coils does not change appreciably the driving torque, for changing the span does not affect the slope of the torque curves; it does, however, change the length of the scale for a given range in the condition being measured, the scale length per unit condition change being made greater as the coil span is increased, and vice versa. I find that for uniformly distributed scales, a given range in the condition being measured is covered by a maximum scale length— that is, the scale length per unit condition change is made greatest—when the angular span of the coils is as great as the deflection range over which the torque characteristics approximate linearity. Thus, when the coils are spaced by this maximum angle, a given scale length per unit condition change is obtained with a maximum value of resistor 4 and accordingly with a maximum driving torque. I therefore preferably space the field coils approximately 130° apart about the pivot axis of the rotor, and do so show the torque characteristics for the coils 32 and 32a as being separated by that angle in Figures 9 and 14. The normal deflection range of the meter as hereinabove defined will then be from the origin O to the point S where the torque characteristic 45a intersects the deflection axis.

It will be noted that when the pointer indicates at the terminal positions of the scale only one of the respective field coils is then energized, for when the pointer reads zero on the scale the junction point C of the coils is at the potential of the junction point between the resistances 3 and 4, and when the pointer reads maximum on the scale the junction point C is at the potential of that between resistances 4 and 5. For a greater range of variation in the resistor element 1, wherein the potential of junction point C is carried beyond the points just noted, the relative directions of the currents in the field coils are reversed. While, for example, the torque characteristics 45 and 45a shown in Figure 9 have the same direction of the deflection ranges just beyond the normal scale range, this relative reversal in the directions of the coil currents causes the respective torques exerted by the coils on the magnet to be yet oppositely directed within these extended deflection ranges. Accordingly, the meter is not limited in its deflection range to the angular span between the coils, but may have a deflection range extending substantially beyond the length of this angular span. Ordinarily, though, at appreciable extensions beyond the normal range, say by 15°, the separation between the scale divisions will be appreciably contracted.

Since in the preferred meter construction herein shown the field coils do not overlap one another they may be made identical. Thus, each coil may be wound on a minimum height of core so as to be in close coupled relation with the pole end portions of the magnet. Also, as the height of the core is reduced the resistance of the coil is decreased to aid further in improving the efficiency of the meter. A yet further feature of importance in realizing improved efficiency is the fact that the field coils are spaced by a wide angle, as this permits the volume of each coil to be increased and permits also each coil to have a wider angular span relative to the pivot axis.

It will be noted that the present meter construction has the important advantages of being not only very simple but also of being very easy to assemble and disassemble. For instance, the complete assembling of the meter is carried out by mounting the two field coils, securing them in place by the band 34, installing the shield 37 and the jewels 18 and 22, and then inserting the rotor and mounting the bridge 20. Additionally, there are the important features in the present construction that both jewels are accessible for replacement and the rotor is removable without disturbing the mounting of the coils. To remove the rotor, it is only necessary to first remove the bridge 20, to then turn the rotor so that the magnet 26 is shifted 180° from its mid-position relative to the scale—that is, to a position where the narrow end thereof is directed toward the apex of the V coil arrangement—and then lift the rotor axially from the frame. The importance of having the rotor so readily removable is to permit the pivots 25 to be replaced as they become worn—they being ordinarily press-fitted into axial bores in the ends of the spindle 24—and the meter to be then reassembled without disturbing its calibration.

Figures 10, 11:
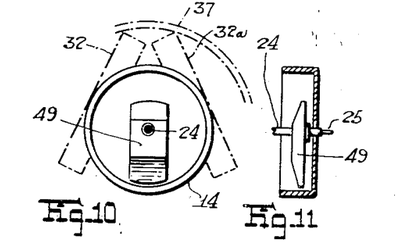
Figure 10 is a fractional axial end view of a ratiometer employing an alternative form of rotor magnet.
Fig. 11 is a fractional axial view, partly in section, of the structure of Figure 10.

In Figures 10 and 11 there is fractionally shown a ratiometer having an alternative form of rotor magnet 49 in accordance with the present invention. This magnet comprises a single bar of permanent magnetic material. It may have substantially even width and thickness, but the thickness may be tapered at the ends for efficiency. This bar magnet is pivoted off center in the direction toward one end thereof, as at a point about one-third the length of the magnet from that end, and each end face may then terminate on a radius equal approximately to two-thirds the length of the magnet. Concentric to the pivot axis is the shield 37, which forms the return path for the useful flux of the magnet. By reason of the non-symmetrical shape of the magnet relative to its pivot axis and the symmetrical positioning of the shield about that axis or, from another standpoint, because of the nearly equal spacing of the short end of the magnet from the cylindrical shield over a wide angle, the flux radiated from the short end will be spread out over a wide angle relative to that radiated from the other longer end of the magnet. Accordingly, the effective center of the flux field of the magnet is displaced from the pivot axis as is obtained in the case of the magnet 26 hereinabove described.

Figure 12:
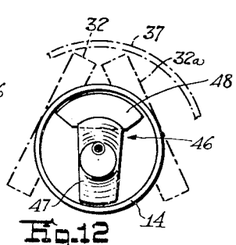
Figure 12 is a view, similar to Figure 10, but showing a second alternative form of magnet according to my invention.
Figure 13:
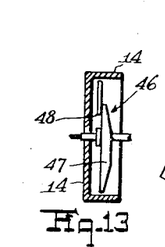
Figure 13 is a fractional axial view, partly in section, of the structure of Figure 12.

In Figures 12 and 13, I illustrate another form of rotor magnet construction 46 according to the present invention. This magnet construction comprises a bar magnet 47 having a shape similar to that of the magnet 49 above described. Applied to the short end portion of this magnet, however, is a shoe 48 made of a non-permanent magnetic material such as of soft iron. The shape of this shoe in particular applications will depend upon the dimensions of the magnet proper, but as a typical case the shoe may have the shape of a truncated sector and be approximately 115° wide. The shoe may be secured to the magnet by soldering or welding, and may overlap a small end portion of the magnet as shown. Alternatively, the shoe may have the central portion thereof shaped to fit the pole face of the short pole end of the magnet and be secured thereto again as by soldering or welding.

I have herein particularly described my invention and specifically illustrated the same in terms of one particular application thereof. While in this particular application I have illustrated my invention only for the purpose of obtaining a uniformly distributed scale, it will be understood that I may employ my invention as well for the purpose of obtaining non-linear scale distributions. Moreover, it will be understood that the particular embodiments of my invention herein shown and described are illustrative and not limitative of my invention as the same are subject to changes and modifications without departure from the scope of my invention, which I endeavor to express according to the following claims.

I claim:

1. An electrical instrument comprising a pivoted permanent magnet construction of generally bar shape, said magnet construction having magnetic poles diametrically opposite its pivot axis; a coil offset from the pivot axis of said magnet construction and energizable to exert a torque influence thereon, one pole of said magnet construction subtending a wide angle relative to the pivot axis thereof and the other pole subtending a relatively narrow angle whereby the respective pole end portions have different torque reaction characteristics with said coil; and a surrounding magnetic member for shielding said pivoted magnet construction from external magnetic fields.

2. An electrical measuring instrument comprising a pivoted permanent bar magnet construction, one pole end portion of said magnet being thicker and smaller in angular width than the other pole end thereof, a coil for producing a magnetic field to influence said magnet construction, said coil having its magnetic axis in a common plane with the pivot axis of said magnet construction and being offset from said pivot axis so that the magnetic field thereof is non-symmetrical relative to said pivot axis, and a member of non-permanent magnetic material symmetrically disposed relative to said pivot axis for shielding said magnet construction from external magnetic fields.

3. An electrical instrument comprising a pivoted permanent magnet construction of generally bar shape, said magnet construction being magnetized on an axis transverse to its pivot axis and having diametrically opposite pole end portions terminating in pole end faces, one of said pole end faces being wide and the other being relatively narrow and said faces having areas substantially equal in magnitude; and a coil for producing a magnetic field to exert a torque influence on said magnet construction, said coil being so positioned that the center thereof is spaced from said pivot axis by a distance of the order of magnitude of half the overall length of said magnet construction.

4. In a ratiometer: the combination of a pivoted magnet having diametrically opposite poles of which one pole is substantially wider than the other; a pair of field coils offset from said pivot axis and positioned so that their magnetic axes are at least substantially in a common plane at right angles to said pivot axis, said coils being at angles to one another, said magnet having an operative range of deflection between positions wherein the broad pole end of the magnet is directed toward the respective coils; and a magnetic shield surrounding said coils and magnet and coaxially arranged relative to said pivot axis.

5. A rotor for an electrical measuring instrument of the moving-magnet type comprising a one-piece permanent magnet of generally bar shape having magnetic poles at opposite ends thereof of which one pole has a width and thickness respectively greater and smaller than the other pole, and the pole end faces of said magnet having areas substantially equal in magnitude.

6. A magnet rotor construction for an electrical measuring instrument comprising a permanent bar magnet having substantially even width throughout its length, pivots secured to said magnet and located on an axis intersecting the magnet at a point offset towards one end thereof; and a shoe of non-permanent magnetic material secured to and extending from the shorter end of said magnet, said shoe being substantially wider than said magnet.

7. In an electrical measuring instrument: the combination of a pivoted magnet construction, and non-permanent magnetic means forming a flux return circuit for said magnet construction, said magnet construction being non-symmetrical relative to its pivot axis and said magnetic means being symmetrically disposed relative to said pivot axis whereby to distribute the flux field of said magnet construction so that the effective center thereof will be displaced from said pivot axis without causing said magnet construction to be magnetically biased by said magnetic means.

8. In an electrical measuring instrument: the combination of a pivoted bar magnet, the pivot axis of said magnet extending therethrough and being offset along the magnetic axis of the magnet towards one end of the magnet; a cylindrical shield member coaxial with said pivot axis and forming the magnetic return circuit for the useful flux of said magnet; and a coil interposed between said magnet and said shield.

9. In an electrical measuring instrument: the combination of a permanent magnet rotor comprising a magnet construction having pole end portions diametrically opposite to the pivot axis thereof, one of said pole end portions being wider than the other so that the flux field of said magnet construction will have the effective center thereof displaced from said pivot axis; and a non-permanent magnetic member spaced from said magnet and symmetrically disposed with respect to said pivot axis, said magnetic member serving as a magnetic return circuit for the useful flux of said magnet construction, and the volume of said magnet construction being proportioned so that the total useful flux radiated from one pole face thereof is substantially equal to that from its other pole face.

10. A ratiometer comprising a cylindrical damping member; a magnet construction of bar shape within said damping member and pivoted at the axis of the latter; a cylindrical shield member concentric to said pivot axis; and a pair of identical field coils between said damping member and shield member, said coils having their core spaces engaged by outer circumferential portions of said damping member and being disposed in V arrangement, the pole end portions of said magnet construction moving through the core spaces of said coils in the operation of the ratiometer, and said magnet construction having a relatively narrow end portion permitting the same to be removed axially from the damping member while the coils are in mounted position upon the narrow end of the magnet being held directed towards the apex of said coil arrangement as the magnet is removed.

11. In an electrical instrument comprising a pivoted magnet construction, a field coil having its magnetic axis perpendicular to the pivot axis of said magnet construction, and a cylindrical shield member coaxial with said pivot axis: a frame construction comprising a cylindrical body having a peripheral recess and an axial bore intersecting said recess; means to pivotally hold said magnet construction within said bore; a cylindrical damping member of nonmagnetic conductive material for said magnet mounted in said bore and projecting into said recess, said projecting portion serving as a localizing means for said field coil, and said body having annular peripheral shoulders for locating said shield member.

12. In an electrical measuring instrument: the combination of a pivoted permanent magnet construction; a pair of field coils offset from said pivot axis and angularly spaced thereabout, said magnet construction having a non-symmetry relative to its pivot axis adapted to differently distribute the flux from the pole ends of the magnet to produce a torque reaction with each coil, on the coil being energized by a given fixed current, which is substantially linear over an angular deflection range at least of the order of 90°, and the axes of said coils being spaced by an angle equal substantially to said range.

13. In an electrical measuring instrument: the combination of a pivoted magnet construction of generally bar shape having its magnetic axis crosswise to its pivot axis, said magnet construction being non-symmetrical relative to its pivot axis and symmetrical relative to a plane through its magnetic and pivot axes whereby the effective center of the flux field thereof is offset from said pivot axis; a plurality of field coils offset from said pivot axis and spaced thereabout; and magnetic means for conveying flux from one pole to another of said magnet, said magnetic means being symmetrically disposed relative to said pivot axis.

14. In an electrical measuring instrument: the combination of a pivoted permanent magnet of generally bar shape having magnetic poles diametrically opposite its pivot axis, one pole end of said magnet being wider and thinner than the other, and said one pole end having a shorter length relative to said pivot axis than the other; a field coil offset from said pivot axis and having its magnetic axis perpendicular to said pivot axis; and a magnetic shield symmetrically disposed relative to said pivot axis for conducting flux from one pole to the other of said magnet.

15. In a ratiometer system comprising an electrical bridge having one branch serially including a variable resistance and a fixed resistance and a second branch serially including three fixed resistances, and two coils connected between said branches from a common point in said one branch to the respective extremities of the middle resistance of said second branch: the combination of a pivoted magnet; means mounting said field coils in positions wherein they are offset from the pivot axis of said magnet and spaced about said pivot axis; and a shield in the flux field of said magnet beyond said coils and symmetrically disposed relative to said pivot axis, said magnet being non-symmetrically shaped relative to its pivot axis to have a greater width, shorter length and smaller thickness at one pole end than at the other, said non-symmetry being adapted to so distribute the flux of the magnet relative to said field coils that the torque reaction of the magnet with each coil, on the coil being energized by a given fixed current, will vary substantially linearly over an angular range of deflection of the order of 90° or more.

16. In an electrical measuring instrument including a pivoted magnetic armature, a field coil for producing a magnetic field to exert a torque influence on said armature, and a surrounding cylindrical magnetic shield: the combination of a cylindrical frame supporting said shield; a member on an end portion of said frame supporting a bearing for said armature; and a permanent magnet adjustably pivotally carried by said member, said permanent magnet serving to produce a zero return torque on said armature.

17. A ratiometer comprising a pivoted permanent magnet construction magnetized transversely to its pivot axis; a surrounding magnetic shield coaxial with said pivot axis; and a pair of coils offset from said pivot axis and spaced angularly thereabout, said coils being energizable to produce superimposed magnetic fields and to exert torque influences on said magnet construction in opposite directions, and said magnet construction being non-symmetrical relative to its pivot axis whereby at varying deflections of the magnet construction and for the same fixed current energization of each of said coils the ratio of the torque exerted on said magnet construction by the coil of lesser influence to that of the coil of greater influence equals substantially $$\frac{D-d}{D+d}$$

where D is ½ the angular range between the axes of said coils and d is the angular deflection of said magnet construction from a position wherein the magnetic axis thereof is midway between said coils.

18. A ratiometer comprising two coils; a pivoted permanent magnet construction magnetized transversely to its pivot axis; and a surrounding shield symmetrical to said pivot axis, said coils being offset from the pivot axis of said magnet construction and being spaced angularly thereabout, and said magnet construction having a non-symmetrical shape relative to its pivot axis adapted to differently distribute the flux from the pole ends thereof so that, for equivalent fixed magnetic fields from said coils, the ratio of the torque exerted on the magnet construction by the coil of lesser influence to that exerted by the coil of greater influence equals substantially $$\frac{D-d}{D+d}$$

where D is ½ the angular range between the axes of the coils and d is the deflection of the magnet construction from a mid-position wherein its magnetic axis is midway between said coils.

GEORGE H. FRITZINGER.

REFERENCES CITED

The following references are of record in the file of this patent:

UNITED STATES PATENTS

| Number | Name | Date |
|---|---|---|
| 1,029,042 | Beede | June 11, 1912 |
| 2,102,409 | Faus | Dec. 14, 1937 |
| 2,175,046 | Warner | Oct. 3, 1939 |
| 2,284,045 | Connolly | May 26, 1942 |
| 2,339,021 | Lingel | Jan. 11, 1944 |